(12) United States Patent
Henrion

(10) Patent No.: US 6,807,177 B2
(45) Date of Patent: *Oct. 19, 2004

(54) SYSTEM AND METHOD FOR ASYNCHRONOUS SWITCHING OF COMPOSITE CELLS, AND CORRESPONSING INPUT PORT AND OUTPUT PORT MODULES

(75) Inventor: Michel Henrion, Belgique (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/381,727
(22) PCT Filed: Jan. 25, 1999
(86) PCT No.: PCT/FR99/00141
§ 371 (c)(1),
(2), (4) Date: Sep. 24, 1999
(87) PCT Pub. No.: WO99/38293
PCT Pub. Date: Jul. 29, 1999

(65) Prior Publication Data
US 2003/0193939 A1 Oct. 16, 2003

(30) Foreign Application Priority Data
Jan. 26, 1998 (FR) .............................. 98 00774

(51) Int. Cl.[7] .............................................. H04L 12/28
(52) U.S. Cl. ..................... 370/395.1; 370/466; 370/474
(58) Field of Search .............................. 370/389, 395.1, 370/465, 466, 472, 474

(56) References Cited

U.S. PATENT DOCUMENTS

| | | | | |
|---|---|---|---|---|
| 5,301,189 A | | 4/1994 | Schmidt et al. | |
| 5,550,820 A | * | 8/1996 | Baran | 370/395.5 |
| 5,805,588 A | * | 9/1998 | Petersen | 370/356 |
| 6,094,432 A | * | 7/2000 | Jeong | 370/395.7 |
| 6,118,779 A | * | 9/2000 | Madonna | 370/353 |
| 6,356,546 B1 | * | 3/2002 | Beshai | 370/358 |
| 6,389,014 B1 | * | 5/2002 | Song | 370/376 |
| 6,442,175 B1 | * | 8/2002 | Shibuya | 370/474 |

FOREIGN PATENT DOCUMENTS

| | | |
|---|---|---|
| EP | 0 827 305 A1 | 3/1998 |
| WO | WO 95/34977 | 12/1995 |
| WO | WO97/33406 | 9/1997 |

OTHER PUBLICATIONS

W. O. Covington et al, Voice Transport of an ATM Broadband Network, Communications Technology for the 1990's and Beyond, Dallas, Nov. 27–30, 1989, vol. 3, Nov. 27, 1989, pp. 1921–1925 XP000091280, Institute of Electrical and Electronics and Engineers.

* cited by examiner

Primary Examiner—Hassan Kizou
Assistant Examiner—Dmitry Levitan
(74) Attorney, Agent, or Firm—Sughrue Mion, PLLC (57) ABSTRACT

The invention relates to a system for asynchronously switching cells, each cell comprising a header field and a data field. At least some of the input modules comprise composite cell forming means, serving in particular to enable channel data blocks to be constructed each comprising a channel data to be transmitted indication extracted from the channel data received and at least one synchronous channel identifier associated with said channel data to be transmitted indication, and means for selectively multiplexing channel data blocks intended for a common destination, in the data field of at least one composite cell. At least some of said output modules comprise means for processing said composite cells, comprising means for extracting and recognizing said received channel data blocks by means of said associated synchronous channel identifiers, and means for transmitting to at least one outgoing link the channel data belonging to the various channels.

17 Claims, 6 Drawing Sheets

SYSTEM AND METHOD FOR ASYNCHRONOUS SWITCHING OF COMPOSITE CELLS, AND CORRESPONSING INPUT PORT AND OUTPUT PORT MODULES

BACKGROUND OF THE INVENTION

The field of the invention is that of transferring and asynchronously switching cells. In particular, the invention is typically concerned with transferring synchronous channels (for example, 64 kbit/s channels of a digital multiplex) using asynchronous cell switches originally designed for switching broadband services.

In a situation of this kind, an essential condition to be complied with is the transfer delay across a switching node for each synchronous channel (ITU Recommendation Q-551 specifies an average transfer delay of 900 $\mu$s, for example, with 95% of 1500 $\mu$s or less). This is the case in particular when using standardized ATM cells, which would imply a cell assembly time of 6 $\mu$s for clustering 48 samples (each on 8 bits) of a 64 kbit/s channel.

Various approaches to reducing cell assembly time have already been proposed, whereby each cell to be switched contains no more than one sample of the same channel.

Solutions of a first category are based on the use of standardized ATM cells in "composite" mode (i.e. for more than one channel), to reduce the enormous increase in bandwidth when an ATM cell (consisting of 424 bits) is used to transfer a single channel sample on 8 bits, which leads to a bandwidth 53 times greater.

Solutions of the second category are based on the use of smaller cells each of which transfers an individual channel sample. However, even in this case, the required bandwidth is large and switching control is complex.

Documents WO 95 34977 and WO 97 33406 describe systems using composite cells and switching channel data between incoming and outgoing channels (on incoming and outgoing multiplex links, respectively) by transferring composite cells (between incoming and outgoing terminal modules connecting said links), each composite cell being able to contain a plurality of channel data blocks. Each 'channel data block' contains not only channel data to be transmitted but also an 'address' relating to that channel.

The system described in document WO 95 34977 uses an ATM 'virtual channel identifier'.

The system described in document WO 97 33406 uses a 'connection identity' which is different from the identity of the incoming or outgoing synchronous channel.

The drawback of those prior art systems is that they require assignment, marking, management and release of configuration data for each individual connection between an incoming synchronous channel and an outgoing synchronous channel.

SUMMARY OF THE INVENTION

An object of the invention is to overcome the above drawbacks.

A first object of the invention is to provide a switching system and method providing a more effective and less complex solution.

Another object of the invention is to provide a system and a method of the above kind improving existing narrowband switching nodes using conventional (PCM) synchronous switches by replacing those switches with asynchronous cell switches.

A further object of the invention is to provide a system and a method of the above kind integrating broadband services and narrowband services in switching nodes using asynchronous cell switching techniques.

The above objects, together with others that become apparent below, are achieved according to the invention by means of a system for asynchronously switching cells each comprising a header field and a data field, of the type interconnecting incoming links and outgoing links, each of said links multiplexing data belonging to at least two channels, said system comprising input port modules and output port modules interconnected by at least one stage of intermediate switching elements, wherein:

at least some of said input modules comprise composite cell forming means comprising:
   means for memorizing channel data received on incoming channels over incoming links of the input port module;
   means for constructing channel data blocks each comprising a channel data to be transmitted, indication extracted from the channel data received, and at least one explicit channel identifier associated with said channel data to be transmitted indication, and
means for selectively multiplexing channel data blocks intended for a common destination corresponding to at least one same destination output port module, in the data field of at least one composite cell to be transmitted to said common destination,
and wherein at least some of said output modules comprise means for processing said composite cells, comprising:
   means for extracting and recognizing said received channel data blocks in the data field of a composite cell by means of said associated explicit channel identifiers, and
   means for transmitting to at least one outgoing link the channel data belonging to the various channels, as a function of said associated explicit channel identifiers,
characterized in that said explicit channel identifier designates:
either the address of an incoming synchronous channel in an input port module,
or the address of at least one outgoing synchronous channel in an output port module.

Both variants are discussed below.

Adding channel identifiers designating the address of the incoming synchronous channel in the input port module or the address of at least one outgoing synchronous channel in the output port module has many advantages, as will emerge below. In particular, it not only eliminates the need to reconfigure each channel but also eliminates the need to rearrange the channels. Also, a system of the above kind is more efficient than the prior art techniques. In particular, if the switching system is of the self-routing kind, it does not require any assignment, marking, management or release of configuration data for each individual connection between an incoming synchronous channel and an outgoing synchronous channel.

Depending on the embodiment, said channel data blocks can be of fixed and identical length or of variable length. In the latter case:
   either the length of each of said channel data blocks is specified by a flag associated with each of said channel data blocks,
   or the length of each of said channel data blocks is fixed for each connection to an outgoing channel and known to the destination output port module.

Said variable lengths are advantageously multiples of a base length.

Said selective multiplexing means can dynamically combine channel data blocks in various ways, and in particular:
- in no predetermined order, depending on the order in which said channel data is received,
- in a predefined order,
- in a predefined order that is modified dynamically in each transmission cycle, or
- in a random or quasi-random order which is modified in each transmission cycle.

Said selective multiplexing means preferably limit the number of channel data blocks to a maximum number of channel data blocks acceptable in the data field of a composite cell.

Said selective multiplexing means advantageously take account of a maximum time for assembling a composite cell and send a composite cell that is not completely full when said maximum time has elapsed.

In one embodiment of the invention, the length of the data field of said composite cells is variable.

In this case, said length of the data field is advantageously adapted dynamically as a function of the number and/or the length of the channel data blocks that said data field contains.

The invention also concerns input port modules and output port modules for use in an asynchronous switching system as defined above.

An input module of the above kind comprising composite cell forming means comprising:
- means for memorizing channel data received on incoming channels over incoming links of the input port module;
- means for constructing channel data blocks each comprising a channel data to be transmitted, indication extracted from the channel data received, and at least one explicit channel identifier associated with said channel data to be transmitted indication, and
- means for selectively multiplexing channel data blocks intended for a common destination corresponding to at least one same destination output port module, in the data field of at least one composite cell to be transmitted to said common destination, is characterized in that said explicit channel identifier designates:
- either the address of an incoming synchronous channel in an input port module,
- or the address of at least one outgoing synchronous channel in an output port module.

Likewise, an output module of the above kind comprising means for processing said composite cells, comprising:
- means for extracting and recognizing said received channel data blocks in the data field of a composite cell by means of said associated explicit channel identifiers, and
- means for transmitting to at least one outgoing link the channel data belonging to the various channels, as a function of said associated explicit channel identifiers, is characterized in that said explicit channel identifier designates:
- either the address of an incoming synchronous channel in an input port module,
- or the address of at least one outgoing synchronous-channel in an output port module.

BRIEF DESCRIPTION OF THE DRAWINGS

Other features and advantages of the invention will become more clearly apparent after reading the following description of a preferred embodiment of the invention which is given by way of illustrative and non-limited example only and with reference to the accompanying drawings, in which:

FIG. 4 shows the structure of a CCC unit shown in FIG. 2, FIGS. 5A, 5B, 5C, 5D and 5E show the buffer memories used by a CAU shown in FIG. 2, and FIGS. 6A and 6B show how two embodiments of an output CCTM.

DETAILED DESCRIPTION OF THE INVENTION

1-Glossary

The following abbreviations are used in the remainder of this description:

ASC: asynchronous switching center,
CCTM: terminal (input or output) port module,
CRI: connection reference identifier,
CHE: channel data block (channel identifier+channel sample),
NCE: number of channel data blocks in a cell (or NCHEIC),
NBCHE: number of bytes per channel,
TNCDC: total number of channels per output CCTM,
NCFC: number of completely filled cells,
NARCH: number of already received channels for an output CCTM,
TNCL: total number of cells,
NCHELC: number of channel data blocks in an incomplete cell (last cell),
ICRU: input channel receive unit,
CTU: cell transmission unit,
ICHS: incoming channel sample,
CAU: cell assembly unit,
ICHI: incoming channel identifier,
ICRC: incoming channel routing control unit,
OCLD: outgoing cell data,
CCC: channel clustering control unit,
ICHRD: incoming channel routing data,
CHCI: channel clustering instructions,
ICTT: incoming channel translation table,
DCCTM: destination CCTM,
OCHI: outgoing channel identifier,
CCCM: channel clustering control memory,
TNCDC: total number of channels per output CCTM,
NARCH: number of already received channels,
CCCL: channel clustering control logic,
CHBM: cell header buffer memory,
DSBM: data buffer memory,
SLPM: slot list pointer memory,
SLLM: slot list memory,
SSAP: start slot address pointer, LSAP: last slot address pointer, CHTI: channel type indicator, and CHEP: position of a channel data block in a cell.

2-Summary of the Prior Art 2-1 Description of a Switching Node

Figure 1:
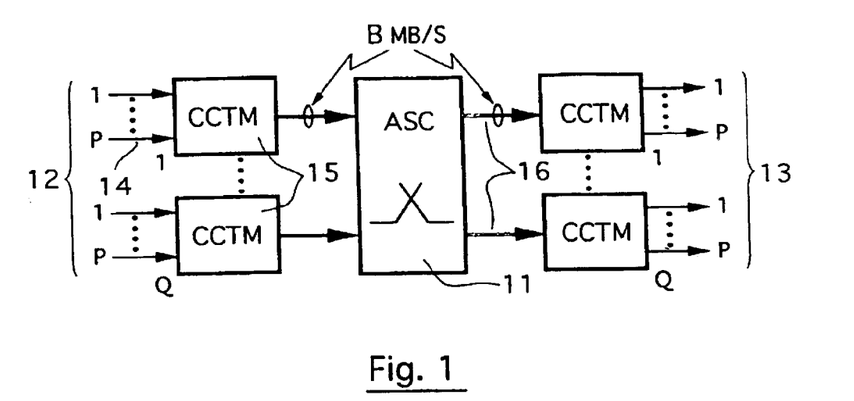
FIG. 1 is a simplified diagram of a switching system to which the invention can be applied.

FIG. 1 shows a switching node 11 interconnecting N=P×Q incoming channels 12 and outgoing channels 13, where:

N is the total number of synchronous channels,

P is the maximum number of channels 14 per CCTM 15, and

Q is the maximum number of CCTM 15 of the switching node 11.

In practice, a CCTM terminates at external interfaces which are multichannel multiplex links, for example links at a primary bit rate of 2.048 Mbit/s multiplexing 32 channels at 64 kbit/s. In this case, P represents the product of the number of lines of the multiplex (p) per CCTM multiplied by the number of channels (c) per multiplex. For example, P=1024 if p=32 and c=32.

The CCTM are connected to the asynchronous switching center (ASC) by cell transfer interfaces 16. Each interface between a CCTM and the ASC can correspond to one or more physical links, but globally equivalent to a bit rate of B Mbit/s.

2-2 Prior Art Technique Using "Composite" ATM Cells

With this approach, only standardized ATM cells are used. In this case, the ASC is an ATM switch and the CCTM/ASC interfaces transport ATM cells each with a fixed length of 53 bytes (424 bits). Consequently, each CCTM can transmit or receive a maximum of B/424 cells per second (where B is the total bit rate available at the ASC interface).

The principle of "composite" cells is based on clustering a plurality (S) of samples of S different channels of the same synchronous multiplex frame (typically 125 µs) in the data field ("payload") of each ATM cell, these S channel samples having to be transferred to a destination CCTM (consequently, the S incoming channels are channels which must be transferred to at least S outgoing channels which all belong to the same destination CCTM).

In the conventional case of 64 kbit/s channels, each channel sample comprises 8 bits and an ATM cell can transport $S_{MAX}$=48 channels maximum in its data field of 48 bytes. However, maximum filling may not always be achieved, because it depends on the distribution of traffic between the incoming channels and the outgoing channels.

In the case of a strictly uniform distribution, each input CCTM would distribute its P channels equally to Q output CCTM, i.e. it would connect P/Q channels between each input and output CCTM pair. An average rate of filling would then be obtained: for example, a cluster of 8 channels per composite cell if P equals 1024 and Q equals 128; a cluster of this kind would lead to the use of 128 cells per frame.

In the other extreme case of a completely unbalanced distribution, the filling would be optimum if all the P channels of an input CCTM had to be transferred to the same output CCTM (for example, for P=1024 (and Q=128), 22 cells are required per frame: 21 full cells with 48 channels and 1 cell containing 16 channels).

It can be shown that the least favorable traffic distribution scenario, i.e. the one leading to the maximum number of "composite" cells per frame (and therefore to the heaviest traffic load of cells at the CCTM/ASC interface) corresponds to the situation in which an input CCTM supports:

Q−1 cells each with only one channel, each routed to a respective one of Q−1 output CCTM, $C_M$ additional cells for the remaining P−(Q−1) cells routed to one output CCTM, $C_M$ therefore being the next higher integer above [P−(Q−1)]/48.

Again assuming that P=1024 and Q=128, the maximum number of cells per CCTM would then be 127+19, i.e. 146 cells per frame with the least favorable traffic distribution scenario.

As indicated by the above few examples of traffic distribution, a "composite" cell technique of the above kind results in a statistically variable number of channels per cell (1<S<48), as a function of the evolution of the distribution of connections between CCTM. Consequently, modifications to the traffic distribution (due to connections being set up or cleared down) imply that some cells must be able to contain more channels and that other cells contain fewer channels than previously.

This situation, when channels are disconnected progressively, leads to a problem of reassigning channels in other cells, unless the CCTM access interfaces are adapted to authorize the maximum number of cells (the next higher integer above P/48) for each output CCTM. Remaining with the same example (P=1024, Q=128), there would be no problem of reassigning channels in other cells if the CCTM were capable of supporting a bit rate of 22×128=2816 cells per 125 µs frame (i.e. approximately 22.5×10⁶ cells per second, i.e. a bandwidth B in the order of 9500 Mbit/s).

However, the least favorable distribution scenario identified above requires many fewer cells if rearrangements are done, namely 146 cells per frame in the given example (i.e. a bandwidth B in the order of only 495 Mbit/s), which is around 20 times less than on the hypothesis of a system with no rearrangement of channels. The existence of situations implying rearrangement of channels can be illustrated by means of a specific example of a change in traffic distribution.

Consider starting from an unfavorable traffic distribution A in which 127 cells each carry one channel to 127 output CCTM denoted CCTM#1 through CCTM#127 and 19 cells carry the remaining 897 channels to the remaining CCTM denoted CCTM#128. Now consider a change of distribution, from distribution A to another unfavorable distribution B in which 127 cells each carry one channel to 127 output CCTM, now CCTM#2 through CCTM#128, and 19 cells carry the remaining 897 channels, now to CCTM#1.

If there is no rearrangement of channels during the transition from situation A to situation B:

the 19 cells addressed to CCTM#128 are still used, but for a progressively decreasing number of channels (tending towards S=0 for most cells), and the single cell for CCTM#1 is filled and additional cells are progressively needed (tending towards 19 cells in total).

On the other hand, if the channels are reorganized into a smaller number of cells in the case of the cells addressed to CCTM#128 (for example by replacing two cells with respectively S1 and S2 channels by a single cell as soon as S1+S2=48), then the total number of cells needed per CCTM will never exceed the maximum total number (Q−1+C) strictly required for the least favorable traffic distribution.

Rearrangement algorithms are available for some types of switch subject to blocking. However, using these rearrangement algorithms leads to a non-negligible increase in complexity, in particular for carrying out the reassignments with a small number of operations without disturbing connections already set up.

2-3 Prior Art Technique Using Small Cells

In this case, transferring only one channel sample per cell becomes more and more efficient as the size of the cells decreases, compared to an ATM cell of 53 bytes.

On the other hand, although the size of the cell decreases, the size of the cell header remains fixed and becomes an increasingly predominant portion of the size of the cell, which constitutes an intrinsic limitation on this approach.

3—Theory of the Technique of the Invention 3-1 Main Feature

The main feature of this approach consists in transferring a plurality of (S) channel samples, typically all belonging to S different channels (and therefore only one sample per channel), clustered into only one cell, but with a respective explicit channel identifier associated with each channel sample.

As described below, this identifier can be the identifier of the input channel in the input CCTM or the identifier of the output channel in the output CCTM.

However, although some real-time service applications (for example digital telephony) impose transfer time constraints such as only one sample of the same channel per cell, the approach as proposed can of course be generalized to situations of a plurality of (a few) samples of the same channel per cell, and thus on the basis of a periodic process applying to a plurality of (a few) successive frames instead of a single frame.

The main difference between this new technique and the conventional prior art technique of "composite" cells is based on the presence of the respective identifiers of the channels associated with each of the S channel samples clustered in the cell. This not only eliminates the need to define the configuration between channel and cell at each connection and disconnection operation, but also eliminates the need for complex rearrangement of the configuration of all the channels among the cells.

This essential difference can be illustrated by the following example. Consider the case of fixed size ATM cells and a situation in which 2 CCTM are connected by 22 channels. In the case of "composite" cells without rearrangement, the 22 channels are configured into four sets of channels, for example: $S1=9$ channels in cell 1, $S2=4$ channels in cell 2, $S3=6$ channels in cell 3 and $S4=3$ channels in cell 4.

If there is no rearrangement (to cluster the 22 channels in only one cell), the 4 sets of channels are fixed (not only their number but also their composition, in that a given channel remains associated with the same set, and therefore the same cell).

On the other hand, with the new approach in accordance with the invention, there is no need for any semi-permanent assignment of a channel to a cell on initializing the connection, because each cell between two CCTM contains an unstructured sequence of channel samples with their associated channel identifiers.

Assuming, by way of example, channel identifiers encoded on 10 bits ($P=1024$) and channel samples on 8 bits, the data field of an ATM cell (48 bytes) can contain up to 21 channel data blocks (each of 10+8 bits). In each cycle (typically per 125 $\mu$s frame), the channel data blocks to be transmitted to a given outgoing CCTM are dynamically clustered in an optimum mode (as explained below, there are several feasible optimizing techniques), with the property that the dynamic clustering can always be effected independently of the clustering performed in preceding cycles.

One feasible technique is to consider the total number of channels to be switched to each outgoing CCTM to fill ATM cells with the first available input channel samples and to transmit a cell when it is completely full or when all the expected channels for the outgoing CCTM concerned have been received. In the preceding example of 22 channels to be switched to a given CCTM, this type of method would lead to the construction of a full first cell with 21 channel data blocks and an incomplete second cell with only one channel data block.

Consider now the disconnection of one of the 22 channels, and thus a change from 22 to 21 channels to be switched to the outgoing CCTM. In the example using conventional "composite" cells, this could be a connection which is part of the four set of channels. In this case, cell 4 would then carry $S4=2$ channels instead of 3 channels.

Using the dynamic clustering technique of the invention, eliminating this connection would simply lead to a new total number of 21 channels (instead of 22), which would then be automatically clustered in a single cell (regardless of the connection that was deactivated).

Dynamic clustering of channels in accordance with the invention assures optimum self-adaptive assembly of channels into cells in each cycle, regardless of changes in traffic distribution, and without requiring even minimal configuration management to associate sets of channels and particular cells.

In the light of the above example, the benefits of introducing explicit channel identifiers associated with the channel samples are clear, namely:

it eliminates semi-permanent management of the assignment of each channel to a structured set of channels to be assembled into a particular cell, and consequently, it eliminates all situations of blocking necessitating rearrangement of channels among the various sets of structured channels per cell in the case of conventional "composite" cells.

In practice, this also results in adequate optimization of the number of bits to be transferred per channel in the cells and a significant reduction in the complexity of the clustering mechanism.

3-2 Optional and Variable Features 3-2-1 Fixed or Variable Cell Size

As mentioned above, in the description of the approach based on conventional "composite" cells, the number of channels per cell (S) is a statistical variable whose value depends strongly on the distribution of traffic between the input CCTM and the output CCTM. Up to a point, this is equally true for the technique of the invention, provided that fixed size cells are used. In this case, the ASC transfers fixed length cells carrying a varying number of channels, some cells being used efficiently (filled) while others are not.

Because of the principle of semi-permanent assignment of channels to structured sets of channels, namely cells, management of the approach using conventional "composite" cells would become even more complex if it were applied to the variable size cell technique. Conversely, the new technique of the invention, based on a self-adaptive approach of dynamic clustering of channels, leads to optimum use of variable size cells.

The dynamic clustering mechanism can use a list of channel data blocks (channel sample+channel identifier) to assemble cells of variable length, the length of the list being known on each cycle because it is either a fixed length or a length derived from the current number of active channels (and possibly other parameters).

There are a number of feasible approaches to the problem of choosing the length of the cells, in particular using either different predetermined lengths or entirely variable lengths. In all cases, this additional improvement provides for better adaptation of the length of the cells as a function of the effective number of channel data blocks to be transported, which therefore improves the overall efficiency of cell transfer across the ASC switch.

3-2-2 Input or Output Channel Identifier

Both variants are feasible, each leading to a different switching architecture with its own properties.

Consider the definition of a synchronous connection between an input channel x in an input CCTM x and an output channel y in an output CCTM y. The two variants are:

Variant A:
- in CCTM x, channel x is known as one having to be connected to channel y in CCTM y,
- the identifier of the outgoing channel (channel y) is used in the cell transferred between CCTM x and CCTM y, and
- the address of the output channel is directly available in CCTM y because it is received explicitly.

Variant B:
- in CCTM x, it is known that channel x must be connected to CCTM y, but not to which specific outgoing channel,
- the identifier of the input channel (channel x) is used in the cell transferred between CCTM x and CCTM y, and
- in CCTM y, input channel x of input CCTM x is known as one having to be connected to output channel y.

In addition to the different location of the data defining the association between the input and output channels of the connection (ch x/CCTM x to ch y/CCTM y), the two architecture variants have the following differences:
- in variant A, only the identifiers of the output channels are needed in the cell,
- in variant B, in addition to the individual identifier of each input channel, there must a direct or indirect indication of the source of the cell (see section 3-2-3), namely the input CCTM x,
- if the output channel can be selected freely (typically from the free channels of an outgoing multiplex line managed by an outgoing CCTM), a free output channel is selected in variant A in CCTM y and the identifier of the selected channel y must therefore be communicated to CCTM x; conversely, in variant B, the request can be effected by CCTM x for input channel x and CCTM y can therefore select locally an output channel y without having to communicate its identifier to CCTM x, and the connection set-up time can therefore be short,
- considering the situation of point-to-multipoint connections between an input channel x and a plurality of (k) output channels $y_1, y_2, \ldots y_k$ which can where applicable belong to different CCTM y, variant A as such is not appropriate because it is desirable to send only one copy of the cannel data to each CCTM y concerned; on the other hand, variant B is more appropriate for point-to-multipoint connections of this type because:
  - in CCTM x, it is known that channel x must be connected to at least one channel y in CCTM $y_1, y_2, \ldots y_k$ and CCTM x therefore makes the necessary copies of the channel x data for the k destination CCTM y, and
  - in each CCTM y concerned, the channel x can equally be locally associated with a plurality of outgoing channels $y_1, y_2, \ldots y_i$ which are known and managed locally.

3-2-3 "With Connection" or "Self-routing" Type Switching Centers (ASC)

Generally speaking, the architecture of asynchronous cell switching centers (ASC) used to interconnect terminal modules (CCTM) can be of two types, namely:

"with connection" when prior setting up of a switchpath is a necessary condition in the ASC to enable it to route cells between incoming and outgoing CCTM, and "self-routing" when it is not necessary to set up switchpaths between the CCTM, each cell being routed individually of its own accord to the appropriate destination CCTM.

The operation in the CCTM of the invention can be described as follows, depending on the type of ASC:

"With connection" type ASC

In this situation, appropriate (point-to-point or point-to-multipoint) connections between incoming and outgoing CCTM must be set up, modified, cleared down as a function of the cell traffic required between the CCTM (which depends on the distribution of traffic between the input and output channels).

With regard to the aspects discussed in section 3-2-2, variants A and B can be used (i.e. an input or output channel identifier can be used in the cells). In the case of variant B, it is not absolutely necessary to provide the identifier of the input CCTM x explicitly, because the connection reference identifier (CRI) can be used to characterize indirectly the fact that the cell has been transmitted by CCTM x (the CRI being implicitly present in the header field of the cell for routing it (for example, the "VCI/VPI" identifier in standardized ATM cells)).

"Self-routing" Type ASC

In this case, the individual cells are routed exclusively on the basis of their destination address, i.e. the output CCTM y, without switchpaths being set up between the CCTM beforehand.

Once again, both variants A and B from section 3-2-2 can be used. However, in the case of variant B, the explicit identifier of the sending CCTM x must be added to the cell (because the cell normally provides in this case only the identifier of the destination CCTM y in its header field).

3-2-4 Channel Clustering Techniques in the Input CCTM

Various channel clustering techniques are feasible for optimizing overall performance and the efficiency of the switching node as a function of the features of the ASC used to connect the CCTM. The key parameters are conventionally the cell traffic load (a function of the size of cells in the case of an ASC with variable size cell management capability), the cell transfer time and the profile with which the cells reach the output CCTM.

The dynamic channel clustering mechanism proposed by the invention offers great flexibility in selecting an optimum method of assembling channels into cells, on account of the absence of constraints on associating channels with cells (because there are no predefined sets of channels per cell). For example:
- the channel data blocks can be grouped into cells according to their actual time of arrival, to minimize the waiting time in the input CCTM,
- the number of channel data blocks per cell (as well as the cell length to be used in the case of variable length cells) can be determined dynamically, as a function of the current number of input channels to be routed to each CCTM y, to minimize the cell traffic load, and
- as an alternative, the number of channel data blocks per second, and possibly the length of the cells, can be modified dynamically (i.e. changed in each cycle) to randomize the time of departure of a cell to the ASC and thereby reduce the time correlation between the time of arrival of the cells in an output CCTM and the synchronous arrival of the channel data in the input CCTM.

3-2-5 Frame Synchronization Between Inputs and Outputs

Depending on the specific implementation and the resulting overall transfer times, correct frame synchronization (i.e. identification of the synchronous frame to which each received channel sample belongs) can be guaranteed automatically or not.

If total transfer time variations make it impossible to determine the correct frame unambiguously, additional frame information can be added to the cell, for example in the form of a bit designating an A or B frame in the case of uncertainty as to whether a received cell belongs to one or the other of two consecutive frames.

This existing technique can be used in combination with the dynamic clustering of channels principle of the invention, either with a common frame flag per cell, when all the channels of a cell belong to the same frame, or with an individual frame flag per channel sample, in the more general situation of transmitting channel samples belonging to different frames in the same cell.

4—Detailed Description of One Embodiment
4-1 Definition of the System

One particular embodiment of the invention will now be described for each of the two variants A and B previously described.

The following conditions apply by way of example:

cycle (i.e. synchronous frame) duration: 125 $\mu$s, channel sample size: 8 bits, channel identifier size: 8 bits (i.e. P=256 channels per CCTM), which gives channel data blocks (CHE) of 8+8=16 bits, number of CCTM (Q): 256 (i.e. 8 bits for the identifier of a CCTM), "self-routing" type ASC, cell transport protocol: variable length multislot cells, multislot cell format: M slots each of 8 bytes:

first slot: (cell header) containing (at least):
- destination CCTM y (output CCTM y) (for self-routing),
- source CCTM x (input CCTM x) in version B,
- number of channel data blocks (NCE) in the cell,
- other control information conventionally contained in the cell header field, and
- up to four channel data blocks (CHE) each of 2 bytes for each subsequent slot.

The table below shows the structure of a variable length cell of the above kind in the case of a cell with 5 slots (M=5).

TABLE I

| Slot | BYTES: | 1 | 2 | 3 | 4 | 5 | 6 | 7 | 8 |
|---|---|---|---|---|---|---|---|---|---|
| 1 | | | | CELL HEADER | | | | | |
| 2 | | CHE1 | | CHE2 | | CHE3 | | CHE4 | |
| 3 | | CHE5 | | CHE6 | | CHE7 | | CHE8 | |
| 4 | | CHE9 | | CHE10 | | CHE11 | | CHE12 | |
| 5 | | CHE13 | | CHE14 | | CHE15 | | CHE16 | |

Note that the information required in the cell header (i.e. the first slot) may not fill the allocated 8 bytes. Additional optimization of the cell size would therefore consist in placing (at least) a first channel data block (CHE1) in the first slot of the cell, to make a small cell including a single slot sufficient to route a single channel data block. To simplify the description, this optimization is not included in the following discussion.

To illustrate the improved efficiency of dynamic clustering of channels in variable length cells, compared to conventional "composite" ATM cells, the table below shows the number of bytes of cells required per channel as a function of the number of multiplexed channels in a cell (NCHEIC).

TABLE II

| NC HEIC | NB CHE2 | NB CHE1 | NC HEIC | NB CHE2 | NB CHE1 |
|---|---|---|---|---|---|
| 1 | 53 | 16 | 13 | 4.1 | 3.1 |
| 2 | 26.5 | 8 | 14 | 3.8 | 2.9 |
| 3 | 17.7 | 5.3 | 15 | 3.5 | 2.7 |
| 4 | 13.2 | 4 | 16 | 3.3 | 2.5 |
| 5 | 10.6 | 4.8 | 17 | 3.1 | 2.8 |
| 6 | 8.8 | 4 | 18 | 2.9 | 2.7 |
| 7 | 7.6 | 3.4 | 19 | 2.8 | 2.5 |
| 8 | 6.6 | 3 | 20 | 2.6 | 2.4 |
| 9 | 5.9 | 3.5 | 21 | 2.5 | 2.7 |
| 10 | 5.3 | 3.2 | 22 | 2.4 | 2.5 |
| 11 | 4.8 | 2.9 | 23 | 2.3 | 2.4 |
| 12 | 4.4 | 2.7 | 24 | 2.2 | 2.3 |

If the multislot cell type described above is used, the number of bytes per channel (NBCHE1) is:

$$NBCHE1 = ([NCHEIC/4]_{r.u.} + 1)*8/NCHEIC$$

where: NCHEIC is the number of multiplexed channels in the cell, and r.u. is the function delivering the first integer higher than or equal to the calculated value.

If conventional "composite" ATM cells are used, the comparable value is:

$$NBCHE2 = 53/NCHEIC.$$

From a quantitative point of view, the above comparison shows that the dynamic channel clustering technique of the invention (despite adding associated channel identifiers to each channel sample) is more efficient with cells of variable length (even in the simplifier embodiment described here) than the conventional "composite" ATM cell technique, with up to 20 channels per cell.

This result is particularly beneficial in conventional applications in which the probability of having to route a large number of channels in the same cell is relatively low, in which case the efficiency of cell transfer multiplexing a limited number of channels is particularly important.

Using the multislot cell transport protocol described above, there is no significant benefit in using longer multislot cells (having a large number of slots). The efficiency as characterized by the ratio NBCHEI shows that a factor in the range from 2.5 to 3 is obtained with between 12 and 16 channels per cell. The maximum length of a cell of the above kind can therefore be limited in practice to N=4 or 5 slots.

In fact, not using longer cells improves the performance of the system in two ways, namely:

the channel assembly time is statistically short, and the cell traffic load in the ASC increases its efficiency because the maximum size of the cells is reduced.

It is therefore assumed below that the maximum length of a cell is five slots (16 CHE maximum per cell).

It is also assumed that a simplified channel clustering technique is used, as follows:

the total number of channels per output CCTM y (TNCDC) is known from the incoming input CCTM x for each CCTM y, the clustering technique is such that dividing TNCDC by 16 (still assuming that 16 is the maximum number of channel data blocks per cell) gives:

a quotient which is the number of completely filled cells (NCFC), i.e. the number of cells each containing 16 channel data blocks, and a remainder which is the number of channel data blocks routed by an additional incompletely filled cell (if the remainder is not zero).

The remainder ($S_L$) is in the range from 0 to 16.

For example, if TNCDC is equal to 25, the number of completely filled channels NCFC (the quotient) is 1 and one additional cell is needed (because the remainder is not zero) to route $S_L$=9 multiplexed channel data blocks in a 4-slot cell.

In practice, a technique of the above kind presupposes a knowledge in a CCTM x of the following two parameters for each output CCTM y:

TNCDC (as defined above), and

NARCH, the number of already received channels.

Because of the assumed modularity of the CCTM (P=256 channels), each of the above two parameters can be encoded on 8 bits, for the range from 1 to 256 (by convention it is assumed that the value 0 is known separately).

The above parameters can therefore be structured as follows, as two half-bytes each of four bits:

TNCDC=TNCL (4 bits), NCHELC (4 bits), and

NARCH=X (4 bits), Y (4 bits).

Accordingly, in accordance with the principles of binary division, TNCL (which can vary from 1 to 16) here represents the total number of cells (to be used for the CCTM y concerned) and NCHELC (also varying from 1 to 16) represents the number of channel data blocks in the last cell.

Consequently, among the TNCL cells, the first TNCL-1 cells are always completely filled and the last cell includes NCHELC channel data blocks (the number of channel data blocks is less than or equal to 16, i.e. the last cell can be completely filled or incompletely filled).

Using NARCH as a counter for the arrival of the various channels to be routed to a given CCTM (which counter is incremented each time a channel concerned is received), the above information can be obtained in the following manner in order to determine how the dynamic clustering-of a new incoming channel must be processed:

if X<TNCL, a maximum size cell is being constructed, and therefore:

if Y<16, the received channel is the $Y^{th}$ channel to be assembled in the cell under construction, but not the last one of a complete cell, if Y =16, the received channel is the $16^{th}$ channel to be assembled in the cell under construction, which is thereafter complete with 16 channel data blocks and therefore ready to be transmitted to CCTM y via the ASC;

if X=TNCL, the last cell is under construction, and therefore:

if Y<NCHELC, the channel received is the $Y^{th}$ channel to be assembled in the cell under construction, but not the last one of the cell, and if Y=NCHELC, the channel received is the last expected channel for completing the last cell, which contains NCHELC channels. The last cell is then ready to be transmitted to the destination CCTM y via the ASC.

The implementation of a CCTM, respectively for an input CCTM and an output CCTM, will now be described on the above basis.

4-2 Input CCTM 4-2-1 Structure

Figure 2:
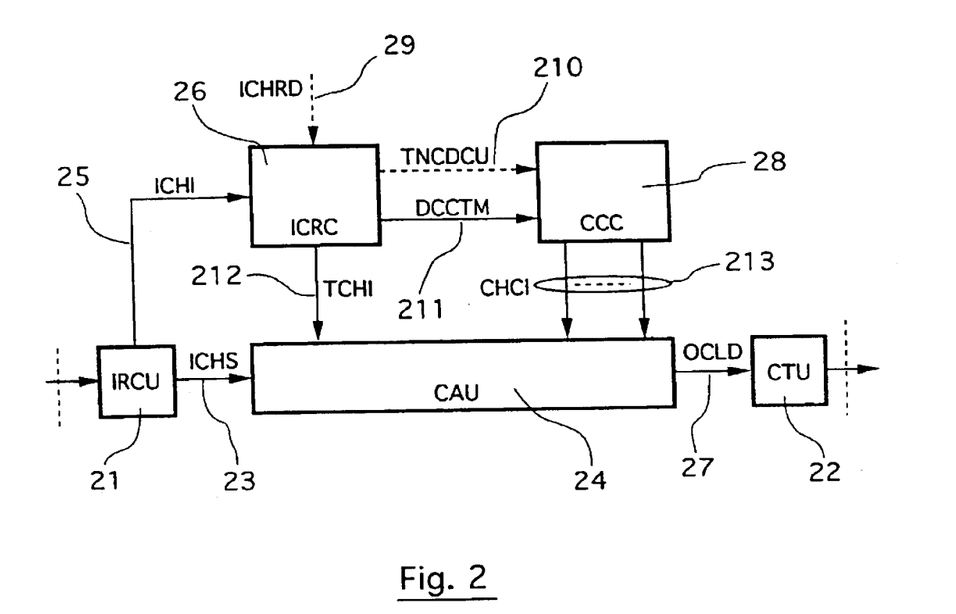
FIG. 2 is a functional block diagram of an input CCTM of the invention.

FIG. 2 is a functional block diagram of one embodiment of an input CCTM (or incoming CCTM) in which the ICRU (input channel receiving unit) 21 and the CTU (cell transmission unit) 22 are not, a priori, dependent on features of the invention.

In each channel time slot (P=256 channel time slots per 125 $\mu$s frame), the ICRU delivers an input channel sample ICHS 23 to the CAU 24 and an input channel identifier ICHI 25 to the ICRC unit.

The ICRU 21 also provide all the necessary external synchronous channel interfaces termination functions.

At the output, the CAU 24 supplies outgoing cell data (OCLD) to the CTU 22 which provides the ASC cell level interface termination functions.

The ICRC unit 26 uses the ICHI identifier (chx) 25 received to determine the corresponding routing data, i.e. the identifier of the destination CCTM (CCTM y) which is transmitted to the CCC (channel clustering control) unit 28, and the output channel identifier (chy) in the case of version A.

Depending on whether version A or B is used, the ICRC unit 26 supplies to the CAU 24 either the identifier of the outgoing output channel (chy) or the identifier of the input channel (chx=ICHI). The ICRC unit 26 also receives the input channel routing data (ICHRD) 29 from a connection control function (not shown in the figure) each time a connection is set up or cleared down.

Then, after updating the routing data, the ICRC unit 26 updates the total number of channels per destination CCTM (TNCDC) managed by the CCC unit 28 by sending it TNCDC updating (TNCDCU) data 210. A unit Z computes the TNCDC updating (TNCDCU) data 210 from the input channel routing data (ICIIRD) 29. The CCC unit 28 uses the received destination CCTM (DCCTM) information 211 to produce instructions 211 for clustering appropriate channels (CHCI) for he CAU 24, using the channel clustering technique previously described.

The CAU 24 receives the input channel sample (ICHS) 23 and the transfer channel identifier (TCHI) 212 and performs the necessary assembly of the data block of the channel in the multislot cell as a function of the instruction CHCI 211 from the CCC unit 28.

Figure 3A:
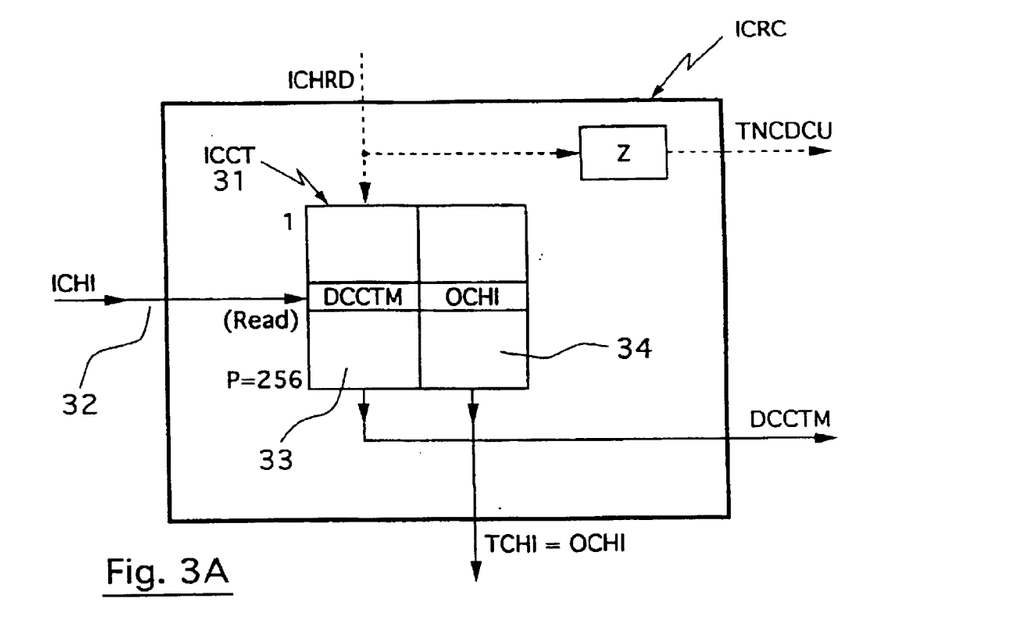
FIGS. 3A and 3B show two embodiments of a translation table used by a ICRC unit shown in FIG. 2.
Figure 3B:
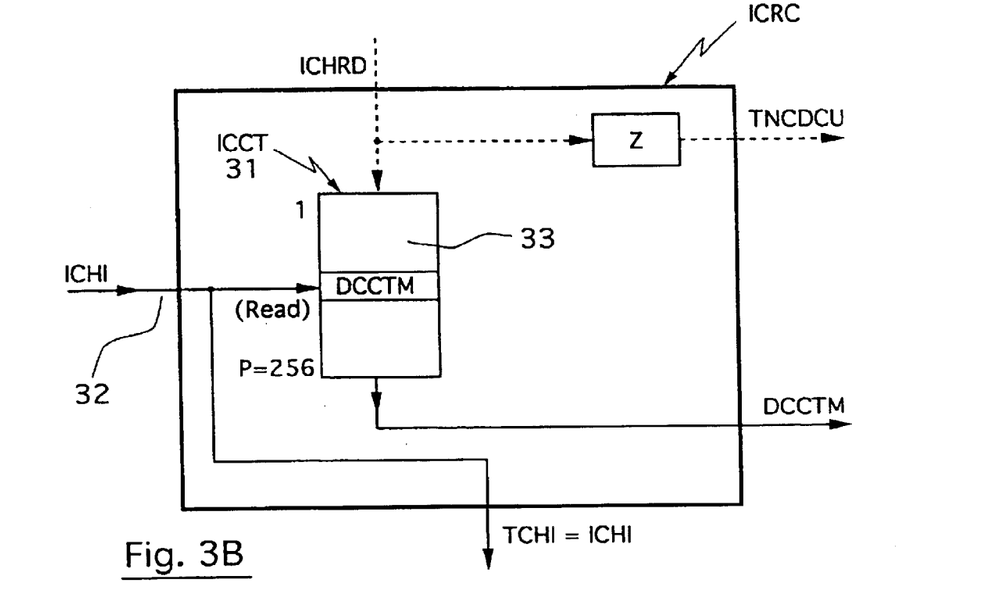

The ICRC unit 26 is organized around an input channel translation table (ICTT), as shown in FIGS. 3A and 3B.

The input of the ICTT 31 selected by the ICHI 32 contains the destination CCTM (DCCTM) 33 to which the input channel must be routed. In the case of version A (FIG. 3A), it also contains the output channel identifier (OCHI) 34. In the context of version B, shown in FIG. 3B, it comprises only the DCCTM 33.

Figure 4:
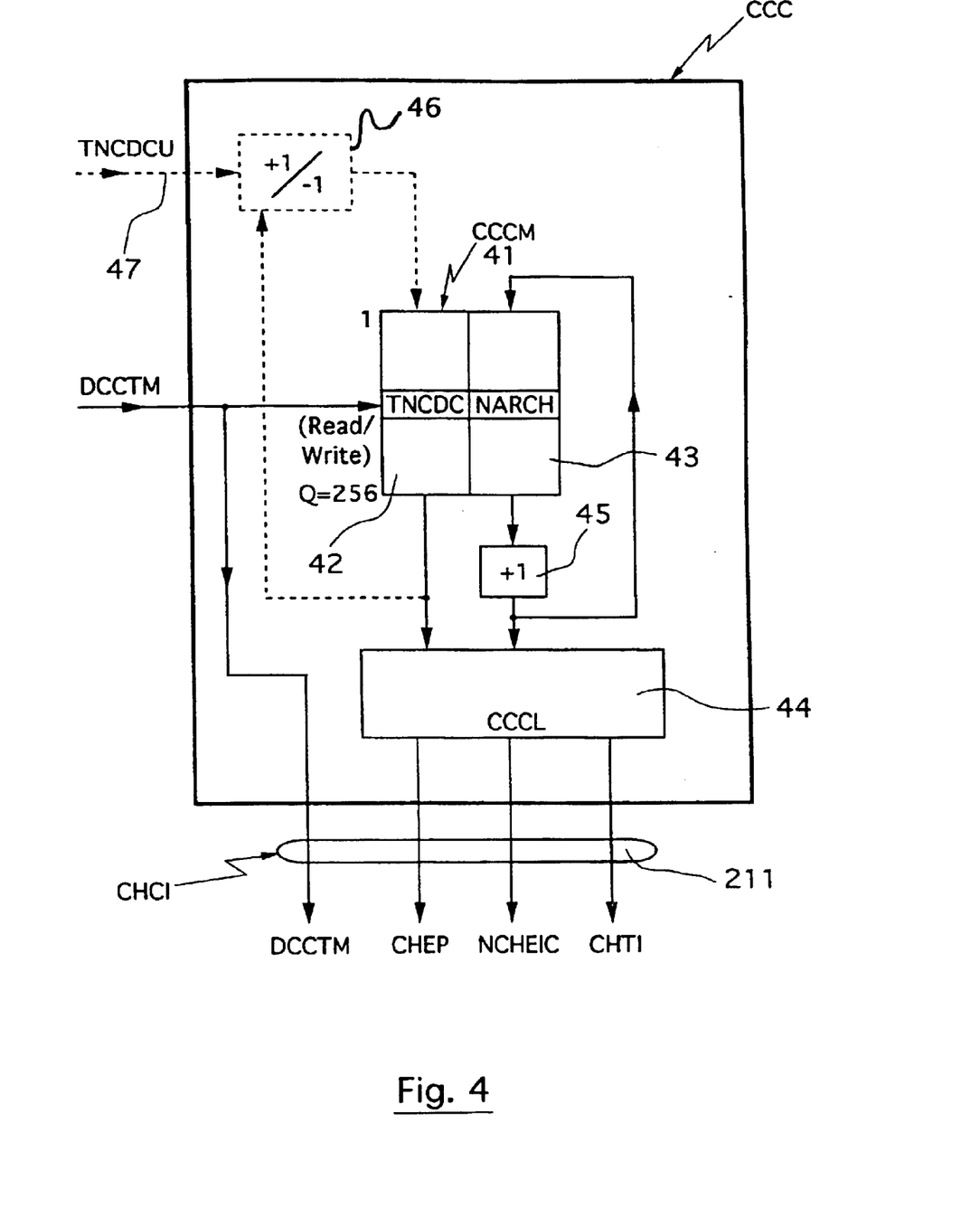

The CCC unit 28 is organized around a channel clustering control memory (CCCM), as shown in FIG. 4. Each memory line of the CCCM 41 selected by a particular CCTM contains the two parameters TNCDC (total number of channels per destination CCTM) 42 and NARCH (number of already received channels) 43, as previously explained.

The two parameters TNCDC 42 and NARCH 43 are transmitted to channel clustering control logic (CCCL) after incrementing (at 45) the value NARCH 44 when a channel is received (the incremented value is then written in the field NARCH at the address concerned in the CCCM).

The CCCL unit 44 performs the logic operations required to implement the previously described channel clustering mechanism and generates the instructions 211 for assembling the appropriate channels (CHCI) for the CAU 24.

In parallel with the above, the parameter TNCDC (total number of channels per destination CCTM) must be updated (at 46), i.e. increment or decremented, each time that TNCDC update (TNCDU) data 47 is sent by the ICRC unit 26 indicating that a channel must be added to or removed from the TNCDC for one of the CCTM (connection set-up or clear-down).

The CAU 24 is organized around two buffer memories used to assemble multislot cells, one for the cell headers (first slots) and the other for the cell data fields (data slots), as shown in FIGS. 5A, 5B, 5C, 5D and 5E.

This particular structure means that the cell header of a new cell can be constructed while receiving the first channel data block (for that cell) which is stored in the second memory.

The first buffer memory 51 is the cell header buffer memory (CHBM) which has $K_H$ inputs of 64 bits, each memory line containing the header of a cell (i.e. the first slot of a cell), which is constructed when a new cell must be assembled for a destination CCTM. The second buffer memory 52 is the data buffer memory (DSBM) which has $K_D$, inputs of 64 bits (eight bytes per slot), each data slot containing up to four channel data blocks.

Each buffer memory 51 and 52 (CHBM and DSDM) is managed like a conventional shared buffer memory in which any available slot memory location can be assigned to a cell by an available slot memory location management function (the available slots are typically managed like a FIFO stack or a chained list of available locations).

The size of the buffer memories CHBM 51 and DSDM 52 (i.e. the number of slot memory locations $K_H$ and $K_D$) is chosen as a function of the probability of there being a requirement for more than $K_H$ and $K_D$ slot memory locations, respectively, for all the cells simultaneously being assembled or awaiting transmission.

For continuous monitoring of the slot addresses CHBM and DSBM for each cell under assembly, a conventional chained list technique is used to chain the addresses of the consecutive cell slots, using two slot address control memories 53 and 54:

a slot list pointer memory (SLPM) 53, and a slot list memory (SLLM) 54.

The SLPM 53 has Q inputs, each corresponding to a particular destination CCTM (DCCTM) and containing address pointers, namely:

a first slot address pointer (FSAP) 55 which designates the address of the first slot of the cell (cell header) stored in the CHBM 51, and a last slot address pointer (LSAP) 56 which designates the address of the last slot of cells currently stored in the DSDM 52.

The SLLM 54 has $K=K_H+K_D$ inputs to cover the complete address range of the two buffer memories 51 and 52 (CHBM and DSDM) and each containing the address of the next slot of the cell in the DSBM 52 (because the next slot may not be the first one of a cell, of course, it is always a data slot, which is therefore stored in the DSBM).

4-2-2 Operation 4-2-2-1 Relations Between the CCC and the CAU

The CCC unit 28 delivers channel clustering instructions to the CAU 24 each time a new channel is received and must be assembled into a cell. In connection with the cell assembly process, three channel reception situations can be encountered by the CCC unit 28 (again assuming that the cell assembly technique is such that the CCC unit 28 still knows the number of channels to be clustered in each cell):

first channel of a cell, intermediate channel of a cell, and last channel of a cell.

These various types of channel are therefore specified by a channel type indicator (CHTI) which can be encoded on two bits: FCH (first channel) and LCH (last channel):

FCH=0 and LCH=0: intermediate channel (neither first nor last),

FCH=0 and LCH=1: last channel,

FCH=1, LCH=0: first channel, and

FCH=1, LCH=1: first and last channel.

Also, the CCC unit 28 supplies the following information to the CAU 24 for each channel received:

the identifier of the destination CCTM (DCCTM), and the position of the channel data block (CHEP) in the cell.

In parallel with this, when a first channel is received, the CCC unit 28 indicates the number of channel data blocks in the cell to the CAU 24.

4-2-2-2 Operations Effected by the CAU

When a new channel is received, the CAU 24 adds the data block of the corresponding channel to a cell, in the following manner, as a function of the channel type indicator (CHTI) given by the CCC unit 28:

A-First Channel

Figure 5A:
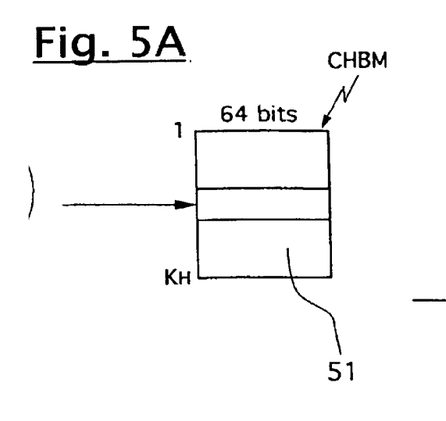
Figure 5B:
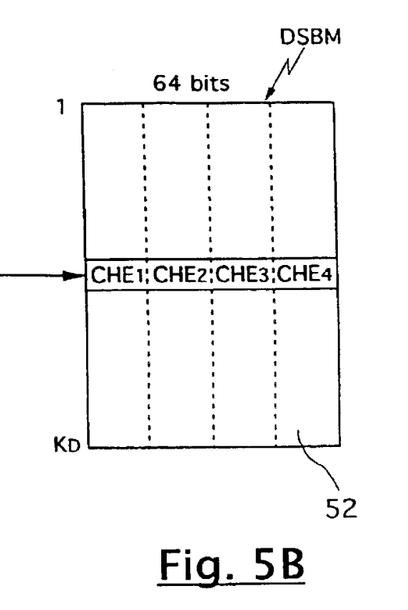
Figure 5C:
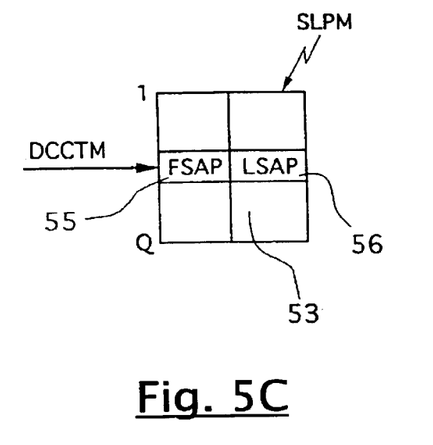
Figure 5D:
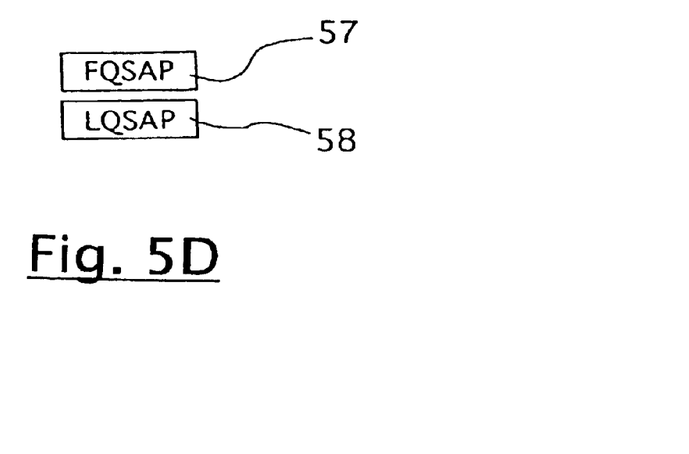
Figure 5E:
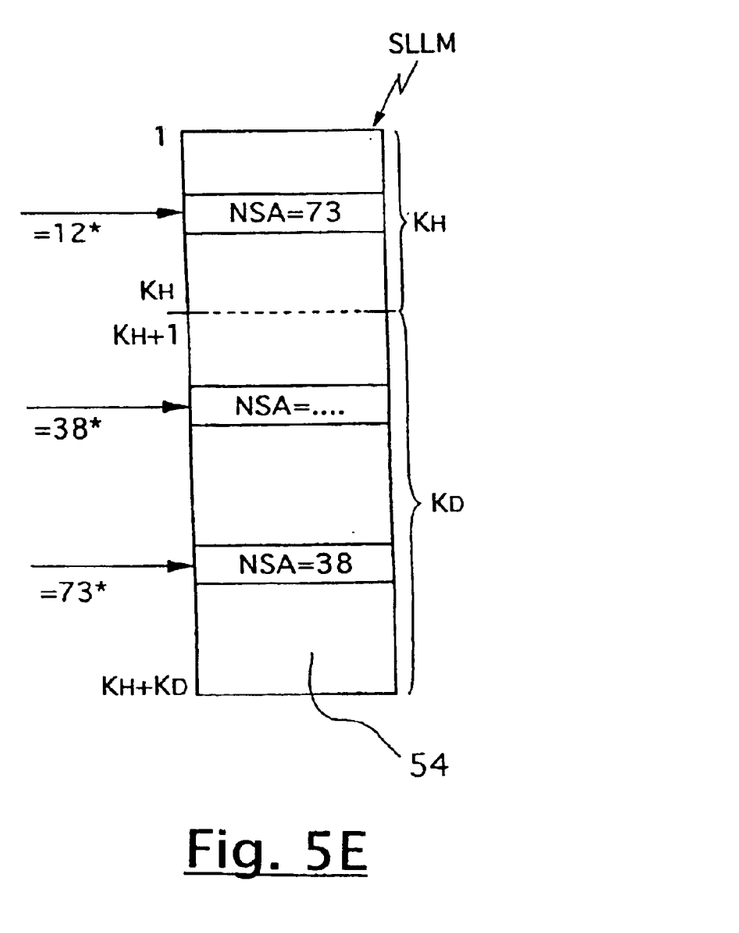

If it is a first channel, a new cell is created for the destination CCTM concerned, which necessitates:

allocating a new first slot (cell header) in the CHBM 51, and allocating a new data slot in the DSBM 52 (for the second slot of the cell).

The selected addresses are stored as follows, in the slot address control memories:

in the input of the DCCTM concerned of the SLPM 53, the first slot supplied is written as the first slot address pointer (FSAP) and the data slot is written as the last slot address pointer (LSAP), and in the SLLM 54, the link between the first two slots is established by writing the address of the data slot (i.e. the second slot) in the memory line corresponding to the first slot.

In parallel with the above, the contents of the two slots are prepared as follows, in the buffer memories:

in the CHBM 51, the cell header is constructed by writing the information required for the cell, comprising:

the identifier of the destination CCTM concerned (to which the cell will be routed), the identifier of the sending CCTM (required for version B only), the number of data channel blocks in the cell (NCHEIC) delivered by the CCC unit 28 as a part of the channel clustering instructions, and in the DSBM 52, the data block of the received channel (i.e. the channel sample and the channel identifier) is stored in the new data slot supplied in the 16-bit field defined by the position of the channel data block (CHEP) supplied by the CCC unit 28 as part of the channel clustering instructions, namely #1 in this instance.

b-Intermediate Channel

In the case of an intermediate channel, the CAU 24 reads the last slot address pointer (LSAP) 56 in the SLPM 53 to find the address of the last current data slot where the received channel data block must be stored in the DSBM 52 at the position defined by the pointer CHEP supplied by the CCC unit 28.

When a fourth channel input is written in a data slot, the latter is completely filled and a new data slot is required and assigned to the cell, in advance.

Consequently, the address of the next data slot is written:
in the SLPM 53, as a last slot address counter (LSAP updating), and
in the SLLM 54 as a new slot address in the memory line of the slot which has just been completed (updating of the chained list).

c-Last Channel

In the case of a last channel, the CAU 24 first stores the last channel data block received in the DSBM 52, at the position designated by the pointer CHEP, in the same way as in the case of an intermediate channel. The cell being complete, it is then transferred to a cell transmission queue to exit the ASC via the CTI.

To perform the transition of a cell from the preceding assembly phase to the new transmission phase, it is equivalent and simpler, instead of effecting an actual transfer of cells between physical buffer memories (i.e. from CHBM and DSBM to another output buffer), to keep the slots in CHBM and DSBM the same, and to transfer only the corresponding cell address pointers (i.e. FSAP and LSAP) to the cell output queue pointers, as follows:

the cell output queue is a simple chained list of slots, such that all the slots of a cell remain chained to each other, and the first slot of a new cell is chained to the last slot of the preceding cell, the list of cells awaiting transmission is managed by two cell output queue pointers:
a first queue slot address pointer (FQSAP) 57, and
a last queue slot address pointer (LQSAP) 58, when a cell is completely assembled and ready to be transmitted, it is added to this complete list by performing the following operations:
writing the FSAP of the cell as a new slot address in the LQSAP input of the list, and
writing the value LSAP as the new value of LQSAP.

This cell transfer technique using only the pointers FSAP and LSAP (without using intermediate links between the slats of a cell) is possible when the complete list of cells awaiting transmission is controlled by the slot list memory (SSLM) used to link the slots of each cell.

Consequently, the cell transmission technique is assured by reading the cell slots successively in the buffers (CHBM and DSBM) in the order defined in the complete chained list of cells awaiting transmission, extracting the slot designated by the pointer FQSAP, and updating the latter with the new slot address found in the chained list memory SLLM.

4-3 Output CCTM

The operation of the output CCTM is relatively simple when the dynamic channel clustering technique described above is used, because this technique eliminates the need for any configuration management associating sets of channels with particular cells in the output CCTM.

Figure 6A:
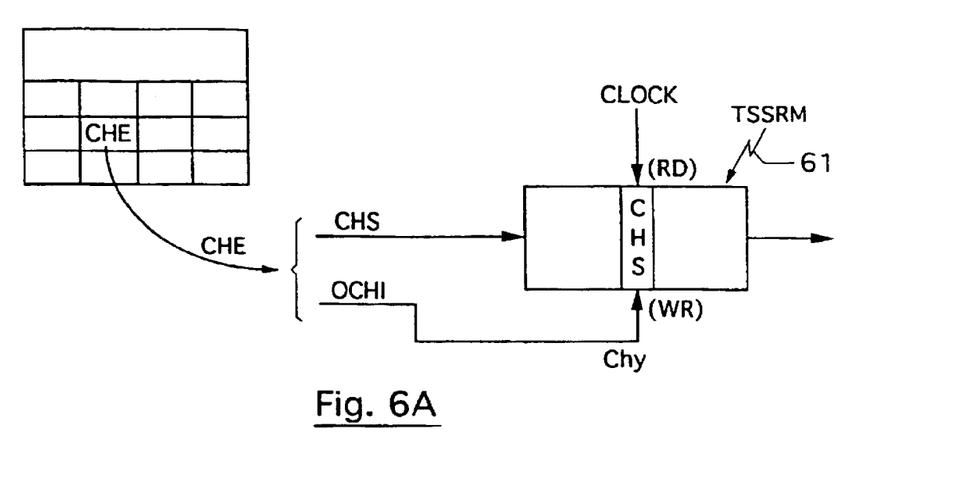
Figure 6B:
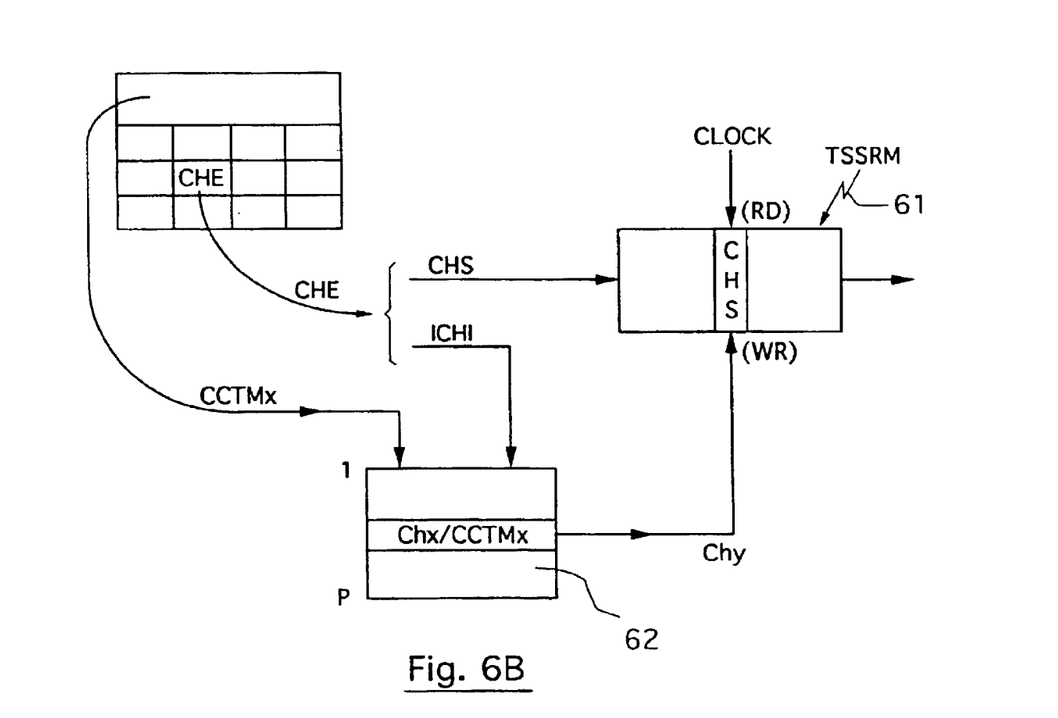

Because of the presence of explicit channel identifiers in each cell, the output CCTM merely extracts the various channel data blocks and transfers the channel samples into a time slot sample receive memory TSSRM 61, as shown in FIGS. 6A and 6B, using the associated channel identifiers as described below according to whether version A (FIG. 6A) or version B (FIG. 6B) described above is used.

In the case of version A, each channel identifier of a data block transmitted in the cell is the output channel Cyy (for CHE), and that channel identifier can be used directly to address the memory TSSRM for memorizing the received channel samples.

In the case of version B, each channel identifier of a transmitted data block is that of the input channel CHx (ICHI). Translation is therefore required to determine which output channel CHy must be associated with the input channel CHx of the source CCTM.

Using a conventional translation table would require a very large memory having P×Q inputs (64 kbytes in the example described), because it must be possible to connect each output channel CHy to any input channel CHx of each CCTMx. A more economic technique uses a content addressable memory (CAM) 62 having P memory lines (one per outgoing channel), each line comprising the connected CHx/CCTMx address; a CAM like this can determine which CHy line contains the address of the incoming channel. The output channel CHy supplied by the CAM is then used in the same way as in the context of version A to memorize the channel sample at address CHy of the TSSRM.

In version A or B, the TSSRM is read synchronously to extract memorized channel samples at the clock rate of the synchronous time frame.

What is claimed is:

1. A system for asynchronously switching cells each comprising a header field and a data field, of the type interconnecting incoming links and outgoing links, each of said links multiplexing data belonging to at least two synchronous channels, said system comprising input port modules and output port modules interconnected by at least one stage of intermediate switching elements, wherein:

at least one of said input modules comprise composite cell forming means comprising:
means for memorizing channel data received on incoming channels over incoming links of the input port module;
means for constructing channel data blocks each channel data block comprising channel data to be transmitted which are extracted from the channel data received and at least one explicit channel identifier associated with said channel data to be transmitted, and
means for selectively multiplexing channel data blocks of different channels intended for a common destination corresponding to at least one same destination output port module, in the data field of at least one composite cell to be transmitted to said common destination, and and wherein at least one of said output modules comprise means for processing said composite cells, comprising:
means for extracting and recognizing said received channel data blocks in the data field of a composite cell by means of said associated explicit channel identifiers, and
means for transmitting to at least one outgoing link the channel data belonging to the various channels, as a function of said associated explicit channel identifier,
wherein said explicit channel identifier explicitly designates the address of an incoming synchronous channel in an input port module, or the address of at least one outgoing synchronous channel in an output port module.

2. A system according to claim 1, characterized in that said channel data blocks are of fixed and identical length.

3. A system according to claim 1 or characterized in that said channel data blocks are of variable length.

4. A system according to claim 3, characterized in that the length of each of said channel data blocks is specified by a flag associated with each of said channel data blocks.

5. A system according to claim 4, characterized in that the length of each of said channel data blocks is fixed for each connection and known to the destination output port module.

6. A system according to claim 3, characterized in that said variable lengths are multiples of a base length.

7. A system according to claim 1, characterized in that said selective multiplexing means dynamically cluster channel data blocks without recourse to a predetermined order and in accordance with the order in which said channel data is received.

8. A system according to claim 1, characterized in that said selective multiplexing means dynamically cluster channel data blocks in a predefined order.

9. A system according to claim 1, characterized in that said selective multiplexing means dynamically cluster channel data blocks in a predefined order that is modified dynamically in each transmission cycle.

10. A system according to claim 1, characterized in that said selective multiplexing means dynamically cluster channel data blocks in a random or quasi-random order that is modified in each transmission cycle.

11. A system according to claim 1, characterized in that said selective multiplexing means limit the number of channel data blocks to a maximum number of channel data blocks acceptable in the data field of a composite cell.

12. A system according to claim 1, characterized in that said selective multiplexing means allow for a maximum duration for assembling a composite cell and transmit a composite cell that is not completely filled when said maximum duration has elapsed.

13. A system according to claim 1 characterized in that the length of the data field of said composite cells is variable.

14. A system according to claims 13, characterized in that said length of the data field is dynamically adapted as a function of the number and/or the length of the channel data blocks that said data field contains.

15. An input port module for use in a system for asynchronously switching cells each comprising a header field and a data field, of the type interconnecting incoming links and outgoing links, each of said links multiplexing data belonging to at least two synchronous channels, said system comprising input port modules and output port modules interconnected by at least one stage of intermediate switching elements, each input module comprising composite cell forming means comprising:
means for memorizing channel data received on incoming channels over incoming links of the input port module;
means for constructing channel data blocks each channel data block comprising channel data to be transmitted which are extracted from the channel data received and at least one explicit channel identifier associated with said channel data to be transmitted, and
means for selectively multiplexing channel data blocks of different channels intended for a common destination corresponding to at least one same destination output port module, in the data field of at least one composite cell to be transmitted to said common destination,
wherein said explicit channel identifier explicitly designater the address of an incoming synchronous channel in an input port module, or the address of at least one outgoing synchronous channel in an output port module.

16. An output port module for a system for asynchronously switching cells each comprising a header field and a data field, which system is of the type interconnecting incoming links and outgoing links, each of said links multiplexing data belonging to at least two synchronous channels, said system comprising input port modules and output port modules interconnected by at least one stage of intermediate switching elements, each output module comprising means for processing said composite cells, comprising:

means for extracting and recognizing said received channel data blocks in the data field of a composite cell by means of said associated explicit channel identifiers, and means for transmitting to at least one outgoing link the channel data belonging to the various channels, as a function of said associated explicit channel identifiers, wherein said explicit channel identifier explicitly designates the address of an incoming synchronous channel in an input port module, or the address of at least one outgoing synchronous channel in an output port module.

17. A method of asynchronously switching cells each comprising a header field and a data field, using a system interconnecting incoming links and outgoing links, each of said links multiplexing data belonging to at least two synchronous channels, said system comprising input port modules and output port modules interconnected by at least one stage of switching elements, comprises the following steps:
forming composite cells in at least one of said input modules, comprising the steps of:
memorizing channel data received on incoming channels over incoming links of the input port module;
constructing channel data blocks each channel data block comprising channel data to be transmitted which are extracted from the channel data received and at least one explicit channel identifier associated with said channel data to be transmitted, and
selectively multiplexing channel data blocks of different channels intended for a common destination corresponding to at least one same destination output port module, in the data field of at least one composite cell to be transmitted to said common destination, and
processing said composite cells in at least one of said output modules, including the steps of:
extracting and recognizing said received channel data blocks in the data field of a composite cell by means of said associated explicit channel identifier, and
transmitting to at least one outgoing link the channel data belonging to the various channels, as a function of said associated explicit channel identifier,
wherein said explicit channel identifier explicitly designates the address of an incoming synchronous channel in an input port module, or the address of at least one outgoing synchronous channel in an output port module.

* * * * *